United States Patent
MacKenzie et al.

(10) Patent No.: US 7,373,499 B2
(45) Date of Patent: May 13, 2008

(54) METHODS AND APPARATUS FOR DELEGATION OF CRYPTOGRAPHIC SERVERS FOR CAPTURE-RESILIENT DEVICES

(75) Inventors: Philip D. MacKenzie, Maplewood, NJ (US); Michael Kendrick Reiter, Pittsburgh, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 703 days.

(21) Appl. No.: 10/183,901

(22) Filed: Jun. 26, 2002

(65) Prior Publication Data

US 2003/0048909 A1   Mar. 13, 2003

Related U.S. Application Data

(60) Provisional application No. 60/300,993, filed on Jun. 26, 2001.

(51) Int. Cl.
*H04L 9/00* (2006.01)

(52) U.S. Cl. ..................................... 713/150

(58) Field of Classification Search ............... 713/155, 713/171, 180, 150, 168; 726/3
See application file for complete search history.

(56) References Cited

U.S. PATENT DOCUMENTS

| | | | |
|---|---|---|---|
| 5,535,276 A | 7/1996 | Ganesan | |
| 5,557,678 A | 9/1996 | Ganesan | |
| 5,588,061 A | 12/1996 | Ganesan et al. | |
| 5,721,779 A * | 2/1998 | Funk | 713/155 |
| 5,737,419 A | 4/1998 | Ganesan | |
| 5,748,735 A | 5/1998 | Ganesan | |
| 5,838,792 A | 11/1998 | Ganesan | |
| 5,905,799 A | 5/1999 | Ganesan | |
| 6,138,235 A * | 10/2000 | Lipkin et al. | 713/155 |
| 6,367,009 B1 * | 4/2002 | Davis et al. | 713/166 |
| 6,601,171 B1 * | 7/2003 | Carter et al. | 713/175 |
| 6,643,774 B1 * | 11/2003 | McGarvey | 713/155 |
| 2002/0112155 A1 * | 8/2002 | Martherus et al. | 713/155 |
| 2002/0147917 A1 * | 10/2002 | Brickell | 713/193 |
| 2003/0216172 A1 * | 11/2003 | LeMay et al. | 463/29 |

OTHER PUBLICATIONS

U.S. Appl. No. 10/072,331, filed Feb. 7, 2002, MacKenzie et al. "Methods and Apparatus for Providing Networked Cryptographic Devices Resilient to Capture".

* cited by examiner

*Primary Examiner*—Emmanual L. Moise
*Assistant Examiner*—Ali S. Abyaneh

(57) ABSTRACT

Improved cryptographic techniques are provided by which a device that performs private key operations (e.g., signatures and/or decryptions), and whose private key operations are protected by a password, is immunized against offline dictionary attacks in case of capture by forcing the device to confirm a password guess with a designated entity or party in order to perform a private key operation, and by which the initiating device may dynamically delegate the password-checking function (i.e., confirmation of the password guess) from the originally designated entity or party to another designated entity or party.

17 Claims, 5 Drawing Sheets

FIG. 2 dvc — svr $202 \sim \alpha \leftarrow_R \{0, 1\}^K$
$204 \sim \beta \leftarrow f(v, \pi)$
$206 \sim \rho \leftarrow_R \{0, 1\}^{\lambda+K+\ell(\lambda)}$
$208 \sim \gamma \leftarrow E_{pk_{svr}}(<\beta, pk_{svr'}, \rho, \alpha>)$
$210 \sim \delta \leftarrow mac_\alpha(<\gamma, \tau>)$ $\xrightarrow{\gamma, \delta, \tau}$
$212$ $<a, b, d_{12}, \zeta, N> \leftarrow D_{sk_{svr}}(\tau) \sim 214$
abort if $mac_\alpha(<\gamma, \tau>) \neq \delta \sim 216$
$<\beta, pk_{svr'}, \rho, \alpha> \leftarrow D_{sk_{svr}}(\gamma) \sim 218$
abort if $\beta \neq b \sim 220$
$<u, d_{22}> \leftarrow D_{sk_{svr}}(\zeta) \sim 222$
abort if $u$ is disabled $\sim 224$
$d_2 \leftarrow d_{12} + d_{22} \sim 226$
$d'_{21} \leftarrow_R \{0, 1\}^{\lambda+K} \sim 228$
$d'_{22} \leftarrow d_2 - d'_{21} \sim 230$
$\zeta' \leftarrow E_{pk_{svr'}}(<u, d'_{22}>) \sim 232$
$\eta \leftarrow \rho \oplus <d'_{21}, \zeta'> \sim 234$
$\delta' \leftarrow mac_\alpha(\eta) \sim 236$ $\xleftarrow{\delta', \eta}$
$238$ $240 \sim$ abort if $mac_\alpha(\eta) \neq \delta'$
$242 \sim <d'_{21}, \zeta'> \leftarrow \rho \oplus \eta$
$244 \sim d'_{11} \leftarrow_R \{0, 1\}^{\lambda+K}$
$246 \sim d'_{12} \leftarrow d_1 - d'_{11}$
$248 \sim d'_1 \leftarrow d'_{11} + d'_{21}$
$250 \sim v' \leftarrow_R \{0, 1\}^K$
$252 \sim a' \leftarrow_R \{0, 1\}^K$
$254 \sim b' \leftarrow f(v', \pi)$
$256 \sim \tau' \leftarrow E_{pk_{svr'}}(<a', b', d'_{12}, \zeta', N>)$
$258 \sim$ store $<svr', pk_{svr'}, \tau', t, v', d'_1, a'>$

FIG. 4

| dvc | svr |
|---|---|

402 — $\beta \leftarrow f(v, \pi)$
404 — $\rho \leftarrow_R \{0, 1\}^{K+\ell(\lambda)}$
406 — $\alpha \leftarrow_R \{0, 1\}^K$
408 — $\gamma \leftarrow E_{pk_{svr}}(<\beta, pk_{svr}, \rho, \alpha>)$
410 — $\delta \leftarrow mac_\alpha(<\gamma, \tau>)$ $\xrightarrow{\gamma, \delta, \tau}$
412

$<a, b, g, p, q, x_{12}, \zeta> \leftarrow D_{sk_{svr}}(\tau)$ — 414
abort if $mac_\alpha(<\gamma, \tau>) \neq \delta$ — 416
$<\beta, pk_{svr}, \rho, \alpha> \leftarrow D_{sk_{svr}}(\gamma)$ — 418
abort if $\beta \neq b$ — 420
$<u, x_{22}> \leftarrow D_{sk_{svr}}(\zeta)$ — 422
abort if $u$ is disabled — 424
$x_2 \leftarrow x_{12} + x_{22} \mod q$ — 426
$x'_{21} \leftarrow_R Z_q$ — 428
$x'_{22} \leftarrow x_2 - x'_{21} \mod q$ — 430
$\zeta' \leftarrow E_{pk_{svr'}}(<u, x'_{22}>)$ — 432
$\eta \leftarrow \rho \oplus <x'_{21}, \zeta'>$ — 434
$\delta' \leftarrow mac_\alpha(\eta)$ — 436

$\xleftarrow{\delta', \eta}$
336

440 — abort if $mac_\alpha(\eta) \neq \delta'$
442 — $<x'_{21}, \zeta'> \leftarrow \eta$
444 — $x'_{11} \leftarrow_R Z_q$
446 — $x'_{12} \leftarrow x_1 - x'_{11} \mod q$
448 — $x'_1 \leftarrow x'_{11} + x'_{21} \mod q$
450 — $v' \leftarrow_R \{0, 1\}^K$
452 — $\alpha' \leftarrow_R \{0, 1\}^K$
454 — $b' \leftarrow f(v', \pi)$
456 — $\tau' \leftarrow E_{pk_{svr'}}(<\alpha', b', g, p, q, x'_{12}, \zeta'>)$
458 — store $<svr, pk_{svr}, \tau, t, v', x'_1, \alpha'>$

METHODS AND APPARATUS FOR DELEGATION OF CRYPTOGRAPHIC SERVERS FOR CAPTURE-RESILIENT DEVICES

CROSS REFERENCE TO RELATED APPLICATIONS

This application claims priority to the U.S. provisional patent application identified as Ser. No. 60/300,993 filed on Jun. 26, 2001, and entitled "Delegation of Cryptographic Servers for Capture-Resilient Devices," the disclosure of which is incorporated by reference herein.

This application is related to the commonly-assigned U.S. patent application identified as Ser. No. 10/072,331 filed on Feb. 7, 2002, and entitled "Methods and Apparatus for Providing Networked Cryptographic Devices Resilient to Capture," the disclosure of which is incorporated by reference herein.

FIELD OF THE INVENTION

The present invention relates to cryptography and, more particularly, to techniques for providing delegation of cryptographic servers for use by cryptographic devices which are resilient to capture.

BACKGROUND OF THE INVENTION

A computing device that performs private key operations, such as signatures and/or decryptions, risks exposure of its private key if captured. While encrypting the private key with a password is common, this provides only marginal protection, since passwords are well-known to be susceptible to offline dictionary attacks. Much recent research has explored techniques for providing better password protections for the private keys on devices that may be captured.

One technique provides for encrypting the private key under a password in a way that prevents the attacker from verifying a successful password guess. This technique is referred to as cryptographic camouflage, see, e.g., D. N. Hoover et al., "Software Smart Cards via Cryptographic Camouflage," 1999 IEEE Symposium on Security and Privacy, pp. 208-215, May 1999, the disclosure of which is incorporated by reference herein.

Another technique provides for forcing the attacker to verify his password guesses at an online server before the use of the private key is enabled, thereby turning an offline attack into an online one that can be detected and stopped. This technique is described in the commonly-assigned U.S. patent application identified as Ser. No. 10/072,331 filed on Feb. 7, 2002, and entitled "Methods and Apparatus for Providing Networked Cryptographic Devices Resilient to Capture," the disclosure of which is incorporated by reference herein. In accordance with this server-based approach, the server may be untrusted (e.g., its compromise does not reduce the security of the device's private key unless the device is also captured) and need not have a prior relationship with the device.

The server-based approach offers certain advantages over the cryptographic camouflage approach, e.g., the server-based approach is compatible with existing infrastructure, whereas cryptographic camouflage requires that public keys be hidden from potential attackers.

However, the server-based approach requires that the device interact with a designated server in order to perform a (and typically each) private key operation. This interaction may become a bottleneck if the designated server is geographically distant and the rate of private key operations is significant.

Thus, there exists a need for techniques which overcome drawbacks associated with the approaches described above and which thereby make networked cryptographic devices more resilient to capture while minimizing or eliminating any potential bottleneck situations.

SUMMARY OF THE INVENTION

The present invention provides improved cryptographic techniques by which a device that performs private key operations (e.g., signatures and/or decryptions), and whose private key operations are protected by a password, is immunized against offline dictionary attacks in case of capture by forcing the device to confirm a password guess with a designated entity or party in order to perform a private key operation, and by which the initiating device may dynamically delegate the password-checking function (i.e., confirmation of the password guess) from the originally designated entity or party to another designated entity or party.

One application of this technique is to allow a user who is traveling to a foreign country to temporarily delegate to a server local to that country the ability to confirm password guesses and aid the user's device in performing private key operations. Even more generally, rather than a server, this function may be temporarily delegated to a token in the user's possession. Another application is related to proactive security for the device's private key, wherein proactive updates are made at the device and servers to eliminate any threat of offline password guessing attacks due to previously compromised servers.

For example, in one aspect of the invention, a method for use in a device associated with a first party (e.g., client device), performed in association with a device associated with a second party (e.g., an originally designated server), for delegating authorization to perform a function (e.g., password-checking operation) from the second party device to a device associated with a third party (e.g., a local server or token in the possession of the client), may comprise the following steps. In the first party device, a request for the partial assistance of the second party device in delegating authorization of the function to the third party device is generated. The request is transmitted from the first party device to the second party device. Results are received in the first party device generated by the second party device based on the partial assistance provided by the second party device. Then, at least a portion of the received results are used in the first party device to delegate authorization to the third party device.

Data stored on the first party device may comprise a piece of secret information associated therewith (e.g., password) which is included in the request. In such case, the partial assistance may be provided by the second party device when a verification is made by the second party device, based on the piece of secret information, that the first party sent the request.

The delegation operation preferably employs three-way function sharing whereby at least a portion of data stored on the first party device was constructed by generating a first share, a second share and a third share of a value (e.g., a private key) associated with the first party device. The first share may be constructed so that the share can be generated from a piece of secret information associated with the first party (e.g., a password) and information stored on the first party device.

Further, data stored on the first party device may comprise an encryption of at least a portion of the third share of the value in accordance with a public key associated with the second party device so as to generate cryptographic information (e.g., a ticket). The request generated in the first party device then includes the cryptographic information or ticket. Then, the share in the request is split at the second party device such that a portion of a third party share is generated at the second party device.

Lastly, at least one value (e.g., another ticket) is generated in the first party device, using at least the portion of the third party share generated by the second party device, for subsequent use between the first party device and the third party device in performing the function.

The third party device may then assist the first party device in performing one or more private key operations. It is to be understood that while private key operations that may be performed in accordance with the invention may comprise many types of decryption operations, the ElGamal decryption protocol is one preferred protocol. Similarly, while private key operations that may be performed in accordance with the invention may comprise many types of signature operations, the RSA (Rivest-Shamir-Adleman) signature protocol is one preferred protocol.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a flow diagram illustrating a delegation protocol in accordance with an embodiment of the present invention;

FIG. 4 is a flow diagram illustrating a delegation protocol in accordance with another embodiment of the present invention.

DETAILED DESCRIPTION OF PREFERRED EMBODIMENTS

Figure 1:
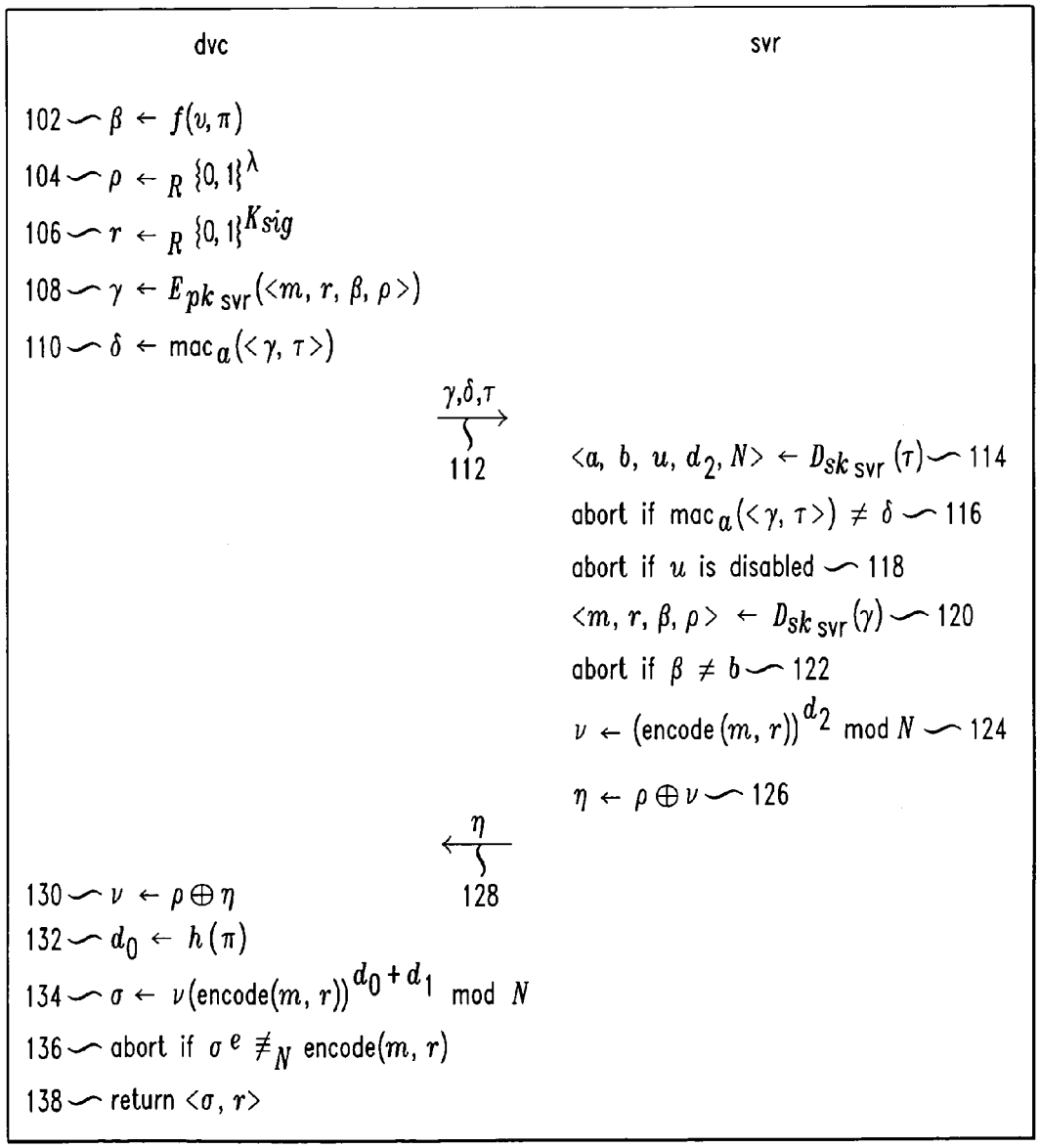
FIG. 1 is a flow diagram illustrating a signature protocol in accordance with an embodiment of the present invention.

The following description will illustrate the invention in the context of a client/server environment, i.e., a client device may temporarily delegate a password-checking function from its originally designated server to another server that is closer to it. However, it should be understood that the invention is not limited to such an environment. Rather, the invention is instead more generally applicable to any environment where a user wishes to temporarily delegate a password-checking function from one entity or party to any other entity or party. For instance, the device may temporarily delegate the function to a token in his possession.

By way of example and without limitation, it is to be understood that a "device" may include any type of computing system, e.g., a personal computer (including desktops and laptops), a personal digital assistant (PDA), a smartcard, a cellular phone, etc. Likewise, by way of example and without limitation, a "server" may also be any type of computing system. However, it is to be understood that the protocols of the invention may be implemented between any two parties or entities. Further, it is to be understood that the term "token" is intended to generally refer to any processing entity that can act like a server such as, by way of example only, a smartcard or a software program on the user's laptop.

Thus, the following detailed description of the invention will provide an illustrative explanation of techniques to alleviate the bottleneck situation described above, and other drawbacks associated with existing approaches, by permitting a user device to temporarily delegate the password-checking function from its originally designated server to another server that is closer to it. For example, as mentioned above, a traveler in a foreign country may temporarily delegate the password-checking function for her laptop computer to a server in the country she is visiting. By doing so, her device's subsequent private key operations will require interaction only with this local server, presumably incurring far less latency than if the device were interacting with the original server. Also, as mentioned above, the user may temporarily delegate to a hardware token in her possession, so that the device may produce signatures or decryptions in offline mode without network access at all.

Delegating the password-checking function from one server to another has security implications. The techniques that serve as a starting point here, i.e., those described in the above-referenced, commonly-assigned U.S. patent application identified as Ser. No. 10/072,331 filed on Feb. 7, 2002, and entitled "Methods and Apparatus for Providing Networked Cryptographic Devices Resilient to Capture," have the useful property that the designated server, in isolation, gains no information that would enable it to forge signatures or decrypt ciphertexts on the device's behalf. However, if both it and the device were captured, then the attacker could mount an offline dictionary attack against the password, and then forge signatures or decrypt ciphertexts for the device if he succeeds.

In the case of delegation, this vulnerability should not extend to any server ever delegated by the device. Rather, a high-level security goal is to ensure that an individual server authorized for password-checking by delegation, and whose authority is then revoked, poses the same security threat as a server to which delegation never occurred in the first place. Specifically, an attacker that captures the device after the device has revoked the authorization of a server (even if the server was previously compromised) must still conduct an online dictionary attack at an authorized server in order to attack the password.

Even with this goal achieved, however, delegation may affect security in at least two ways. First, if the attacker captures the device, then it can mount an online dictionary attack against each currently authorized server, thereby gaining more password guesses than any one server allows. Second, a feature of the protocols of Ser. No. 10/072,331 is that the password-checking server could be permanently disabled for the device even after the device and password were compromised. By doing so, the device can never sign or decrypt again.

In a system supporting delegation, however, if the device and password are compromised, and if there is some authorized server when this happens, then the attacker can delegate from this authorized server to any server permitted by the policy set forth when the device was initialized. Thus, to be sure that the device will never sign or decrypt again, every server in this permissible set must be disabled for the device.

The present invention also provides a technique for realizing proactive security, as described in A. Herzberg, et al., "Proactive Public Key and Signature Systems," ACM Conf. on Comp. and Comm. Security, pp. 100-110, 1997, the disclosure of which is incorporated by reference herein, in the context of the server-based password-checking scenario. As is known, proactive security encompasses techniques for periodically refreshing the cryptographic secrets held by various components of a system, thereby rendering any cryptographic secrets captured before the refresh useless to the attacker. The delegation protocol of the invention can be used as a subroutine for proactively refreshing a password-checking server, so that if the server's secrets had been exposed, they are useless to the attacker after the refresh. In particular, if the attacker subsequently captured the device, any dictionary attack that the attacker could mount would be online, as opposed to offline.

To illustrate the principles of the invention, security issues associated with delegation are described followed by a description of delegation techniques for RSA signing (as described in R. L. Rivest, "A Method of Obtaining Digital Signatures and Public Key Cryptosystems," Communications of the ACM, vol. 21(2), pp. 120-126, February 1978, the disclosure of which is incorporated by reference herein) and ElGamal decryption (as described in T. ElGamal, "A Public Key Cryptosystem and a Signature Scheme Based on Discrete Logarithms," IEEE Transactions on Information Theory, vol. 31, pp. 469-472, 1985, the disclosure of which is incorporated by reference herein). However, the invention is not limited to use in accordance with any particular signing or decrypting protocols.

It is to be understood that supporting delegation for these protocols not only involves providing custom delegation protocols for RSA and ElGamal keys, but also modifying the signing and decryption protocols of Ser. No. 10/072,331 to accommodate delegation. For example, an RSA system of the invention utilizes three-way function sharing, versus the two-way function sharing used in the system of Ser. No. 10/072,331. And, whereas the original systems of Ser. No. 10/072,331 permitted the server to conduct an offline dictionary attack against the user's password (without placing the device's signing key at risk), here a server is prevented from conducting such an attack.

An illustrative system for implementing delegation according to the invention comprises a device referred to as "dvc" and an arbitrary, possibly unknown, number of servers. A server will be denoted by "svr," possibly with subscripts or other annotations when useful. An example of such an arrangement will be described below in the context of FIG. 5. The device communicates to a server over a public network. In the protocols of the invention, the device is used either for generating signatures or decrypting messages, and does so by interacting with one of the servers. The signature or decryption operation is password-protected, by a password $\pi_0$. The system is initialized with public data, secret data for the device, secret data for the user of the device (i.e., $\pi_0$), and secret data for each of the servers. The public and secret data associated with a server may simply be a certified public key and associated private key for the server, which is preferably set up well before the device is initialized.

The device-server protocol allows a device operated by a legitimate user (i.e., one who knows $\pi_0$) to sign or decrypt a message with respect to the public key of the device, after communicating with one of the servers. This server must be "authorized" to execute this protocol, as defined below. The system is initialized with exactly one server authorized, denoted $svr_0$. Further servers may be authorized, but this authorization cannot be performed by dvc alone. Rather, for dvc to authorize svr, another already-authorized server svr' must also consent to the authorization of svr, after verifying that the authorization of svr is consistent with policy previously set forth by dvc and is being performed by dvc with the user's password.

In this way, authorization is a protected operation just as signing and decryption are protected. The device can unilaterally revoke the authorization of a server when it no longer intends to use that server. A server can be disabled (for a device) by being instructed to no longer respond to that device or, more precisely, to requests involving its key.

For the purposes of illustrating the invention, the aforementioned policy dictating which servers can be authorized is expressed as a set U of servers with well-known public keys. That is, an authorized server svr will consent to authorize another server svr' only if svr' ∈U. Moreover, it is assumed that svr can reliably determine the unique public key $pk_{svr'}$ of any svr' ∈U. This policy may be expressed more flexibly. For example, one policy may allow any server with a public key certified by a given certification authority to be authorized. For such a policy, the delegation protocols of the invention may be augmented with the appropriate certificates and certificate checks. Given the inventive teachings herein, such augmentation is straightforward and thus well within the skill of the ordinary artisan.

To specify security for a delegation-enabled system, one must consider the possible attackers that attack the system. Each attacker considered is presumed to control the network; i.e., the attacker controls the inputs to the device and every server, and observes the outputs. Moreover, an attacker can permanently compromise certain resources. The possible resources that may be compromised by the attacker are any of the servers, dvc, and $\pi_0$. Compromising reveals the entire contents of the resource to the attacker. The one restriction on the attacker is that if he compromises dvc, then he does so after dvc initialization and while dvc is in an inactive state (i.e., dvc is not presently executing a protocol with $\pi_0$ as input) and that $\pi_0$ is not subsequently input to the device by the user. This decouples the capture of dvc and $\pi_0$, and is consistent with the motivation that dvc is captured while not in use by the user and, once captured, is unavailable to the user.

Aspects of the system described thus far are formalized as a collection of events:

1. dvc.startDelegation(svr, svr'): dvc begins a delegation protocol with server svr to authorize svr'.
2. dvc.finishDelegation(svr, svr'): dvc finishes a delegation protocol with server svr to authorize svr'. This can occur only after a dvc.startDelegation(svr,svr') with no intervening dvc.finishDelegation(svr, svr'), dvc.revoke(svr) or dvc.revoke(svr').
3. dvc.revoke(svr): dvc revokes the authorization of svr.
4. svr.disable: svr stops responding to any requests of the device (signing, decryption, or delegation).
5. dvc.comp: dvc is compromised (and captured).
6. svr.comp: svr is compromised.
7. $\pi_0$.comp: the password $\pi_0$ is compromised.

The time of any event x is given by T(x). Now, the following predicates are defined for any time t:

authorized$_t$(svr) is true if either (i) svr=$svr_0$ and there is no dvc.revoke($svr_0$) prior to time t, or (ii) there exist a svr' and event x=dvc.finishDelegation(svr', svr) where authorized$_{T(x)}$(svr') is true, T(x)<t, and no dvc.revoke (svr) occurs between T(x) and t. In case (ii), svr' is referred to as the consenting server.

nominated$_t$(svr) is true if there exist a svr' and event x=dvc.startDelegation(svr', svr) where authorized$_{T(x)}$(svr') is true, T(x)<t, and none of dvc.finishDelegation (svr', svr), dvc.revoke(svr), or dvc.revoke(svr') occur between T(x) and t.

For any event x, let Active(x)={svr: nominated$_{T(x)}$(svr) ∨ authorized$_{T(x)}$(svr)}.

It is convenient in specifying security goals to partition attackers into four classes, depending on the resources they compromise and the state of executions when these attackers compromise certain resources. An attacker is assumed to fall into one of these classes independent of the execution, i.e., it does not change its behavior relative to these classes depending on the execution of the system. In particular, the resources an attacker compromises are assumed to be independent of the execution. In this sense, only static attackers (in contrast to adaptive ones) are considered.

A1. An attacker in class (A1) does not compromise dvc or compromises dvc only if Active(dvc.comp)=emptyset. This is an (A1) attacker.

A2. An attacker in class {adv:online} is not in class (A1), does not compromise $\pi_0$, and compromises dvc only if svr.comp never occurs for any svr in Active(dvc.comp). This is an {adv:online} attacker.

A3. An attacker in (A2) is not in class (A1), does not compromise $\pi_0$, and compromises dvc only if svr.comp occurs for some svr in Active(dvc.comp). This is an (A2) attacker.

A4. An attacker in class {adv:disable} is in none of classes (A1), {adv:online}, or (A2), and does not compromise any svr in U. This is an {adv:disable} attacker.

Now, security goals of a delegation-enabled system against these attackers are stated as follows (disregarding events that occur with negligible probability):

G1. An (A1) attacker is unable to forge signatures or decrypt messages for dvc. This is goal (G1).

G2. An {adv:online} attacker can forge signatures or decrypt messages for the device with probability at most q/|D|, where q is the total number of queries to servers in Active(dvc.comp) after T(dvc.comp), and dict is the dictionary from which the password is drawn (at random). This is goal {goal:online}.

G3. An (A2) attacker can forge signatures or decrypt messages for the device only if it succeeds in an offline dictionary attack on the password. This is goal (G3).

G4. An {adv:disable} attacker can forge signatures or decrypt messages only until max$_{svr}$ in U {T(svr.disable)}. This is goal (G4).

These goals can be more intuitively stated as follows. First, if an attacker does not capture dvc, or does so only when no servers are authorized for dvc (A1), then the attacker gains no ability to forge or decrypt for the device (G1). On the other extreme, if an attacker captures both dvc and $\pi_0$ (A4), and thus is indistinguishable from the user, it can forge only until all servers are disabled (G4) or indefinitely if it also compromises a server. If the attacker compromises a server along with both dvc and $\pi_0$, then it can delegate from any authorized server to that compromised server to forge or decrypt indefinitely.

The "middle" cases are if the attacker compromises dvc and not $\pi_0$. If it compromises dvc and no then-authorized server is ever compromised ({adv:online}), then the attacker can do no better than an online dictionary attack against $\pi_0$ ({goal:online}). If, on the other hand, when dvc is compromised some authorized server is eventually compromised (A2), then the attacker can do no better than an offline attack against the password (G3).

These properties offer an approach to proactively update dvc to render useless to an attacker any information it gained by compromising a server. That is, suppose that each physical computer running a logical server svr periodically instantiates a new logical server svr' having a new public and private key. If dvc delegates from svr to svr', and if then dvc revokes svr, any disclosure of information from svr (e.g., the private key of svr) is then useless for the attacker in its efforts to forge or decrypt for dvc. Rather, if the attacker captures dvc, it must compromise svr' in order to conduct an offline attack against dvc.

Before explaining the protocols of the invention, we first introduce some definitions and notations associated with a variety of cryptographic tools which will be used in accordance with the protocol explanations.

Security parameters. Let $\kappa$ be the main cryptographic security parameter; a reasonable value today may be $\kappa$=160. We will use $\lambda > \kappa$ as a secondary security parameter for public keys. For instance, in an RSA public key scheme, we may set $\lambda$=1024 to indicate that we use 1024-bit moduli.

Hash functions. We use h, with an additional subscript as needed, to denote a hash function. Unless otherwise stated, the range of a hash function is $\{0, 1\}^\kappa$. It is generally preferred that these hash functions behave like random oracles, see, e.g., M. Bellare et al., "Random Oracles Are Practical: A Paradigm for Designing Efficient Protocols," ACM Conference on Computer and Communications Security, pp. 62-73, November 1993, the disclosure of which is incorporated by reference herein. However, hash functions with weaker properties may be employed.

Keyed hash functions. A keyed hash function family is a family of hash functions $\{f_v\}$ parameterized by a secret value v. We will typically write $f_v(m)$ as f(v, m). We also use a specific type of keyed hash function, a message authentication code (MAC). We denote a MAC family as $\{mac_a\}$. We do not require MACs to behave like random oracles.

Encryption schemes. An encryption scheme $\epsilon$ is a triple ($G_{enc}$, E, D) of algorithms, the first two being probabilistic, and all running in expected polynomial time. $G_{enc}$ takes as input $1^\lambda$ and outputs a public key pair (pk, sk), i.e., (pk, sk)←$G_{enc}(1^\lambda)$. E takes a public key pk and a message m as input and outputs an encryption c for m; we denote this c←$E_{pk}(m)$. D takes a ciphertext c and a secret key sk as input and returns either a message m such that c is a valid encryption of m, if such an m exists, and otherwise returns ⊥.

It is preferred that an encryption scheme be secure against adaptive chosen ciphertext attacks, see, e.g., C. Rackoff et al., "Non-interactive Zero-knowledge Proof of Knowledge and Chosen Ciphertext Attack," Advances in Cryptology—CRYPTO '91, pp. 433-444, 1991, the disclosure of which is incorporated by reference herein. Other examples can be found in M. Bellare et al., "Optimal Asymmetric Encryption," Advances in Cryptology—EUROCRYPT '94, Lecture Notes in Computer Science 950, pp. 92-111, 1995; and R. Cramer et al., "A Practical Public Key Cryptosystem Provably Secure Against Adaptive Chosen Ciphertext Attack," Advances in Cryptology—CRYPTO '98, Lecture Notes in Computer Science 1462, pp. 13-25, 1998, the disclosures of which are incorporated by reference herein.

Signature schemes. A digital signature scheme S is a triple ($G_{sig}$, S, V) of algorithms, the first two being probabilistic, and all running in expected polynomial time. $G_{sig}$ takes as input $1^\lambda$ and outputs a public key pair (pk, sk), i.e., (pk, sk)←$G_{sig}$ ($1^\lambda$). S takes a message m and a secret key sk as input and outputs a signature (e for m, i.e., σ←S(sk,m)). V takes a message m, a public key pk, and a candidate signature σ' for m as input and returns the bit b=1 if σ' is a valid signature for m, and otherwise returns the bit b=0. That is, b←V(pk,m,σ'). Naturally, if σ←S(sk,m), then V(pk,m, σ)=1.

1. Delegation for S-RSA

As mentioned above, the U.S. patent application identified as Ser. No. 10/072,331 described several systems by which dvc could involve a server for performing the password-checking function and assisting in its cryptographic operations, and thereby gain immunity to offline dictionary attacks if captured. The first of these systems, denoted "generic," did not support the disabling property (the instantiation of G4 for a single server and no delegation), but worked for any type of public key algorithm that dvc used. As part of the signing/decryption protocol in this system, dvc recovered the private key corresponding to its public key. This, in turn, renders delegation in this system straightforward, being roughly equivalent to a re-initialization of the device using the same private key, but for a different server. The changes needed to accommodate delegation are also reflected in the RSA system detailed herein, and so further discussion of a generic protocol is not necessary.

The system described in Ser. No. 10/072,331 by which dvc performs RSA signatures is called S-RSA. At a high level, S-RSA uses 2-out-of-2 function sharing to distribute the ability to generate a signature for the device's public key between the device and the server. The server, however, would cooperate with the device to sign a message only after being presented with evidence that the device was in possession of the user's correct password.

In this section, a new system for RSA signatures is described, called S-RSA-DEL, that supports delegation in addition to signatures. In order to accommodate delegation in this context, the device's signature function is shared using a 3-out-of-3 function sharing, where one of the three shares is generated from the password itself. In this way, the user share (i.e., the password) may remain the same while the device share is changed for delegation purposes. Also, the server share is split into an encrypted part generated by the consenting server and an unencrypted part generated by the device, to allow the device to construct a new ticket in which neither the device nor the consenting server can determine the new server's share. Other inventive features are implemented as well; e.g., whereas the server in the S-RSA system could mount an offline dictionary attack against the user's password (without risk to the device's signature operations), here we prevent the server from mounting such an attack.

1.1 Preliminary Considerations

It is presumed that the device signs using a standard encode-then-sign RSA signature algorithm (e.g., "hash-and-sign" as described in D. E. Denning, "Digital Signatures with RSA and Other Public-key Cryptosystems," Communications of the ACM 27(4):388-392, April 1984, the disclosure of which is incorporated by reference herein) as described below.

The public key of the device is $pk_{dvc}$=<e, N> and the secret key is $sk_{dvc}$=<d, N, φ(N)>, where ed≡$_{\phi(N)}$ 1, N is the product of two large prime numbers, and φ is the Euler totient function. The notation ≡$_{\phi(N)}$ means equivalence modulo φ(N). The device's signature on a message m is defined as follows, where 'encode' is the encoding function associated with S, and $K_{sig}$ denotes the number of random bits used in the encoding function (e.g., $\kappa_{sig}$=0 for a deterministic encoding function):

$$S<d, N, \phi(N)>(m): r \leftarrow_R \{0, 1\}^{\kappa_{sig}}$$

$$\sigma \leftarrow (\text{encode}(m, r))^d \mod N$$

return<σ, r>

Note that it may not be necessary to return r if it can be determined from m and σ. We remark that "hash-and-sign" is an example of this type of signature in which the encoding function is simply a deterministic hash of m, and that PSS (as described in M. Bellare et al., "The Exact Security of Digital Signatures—How to Sign with RSA and Rabin, Advances in Cryptology—EUROCRYPT '96, Lecture Notes in Computer Science 1070, pp. 399-416, 1996, the disclosure of which is incorporated by reference herein) is another example of this type of signature with a probabilistic encoding.

Both of these types of signatures were proven secure against adaptive chosen message attacks in the random oracle model. Any signature of this form can be verified by checking that $\sigma^e \equiv_N$ encode (m, r). In the function sharing primitive used in the system of the invention, d is broken into shares $d_0$, $d_1$ and $d_2$ such that $d_0+d_1+d_2 \equiv_{\phi(N)} d$.

1.2 Device Initialization

The inputs to device initialization are the identity of $svr_0$ and its public encryption key $pk_{svr_0}$, the user's password $\pi_0$, the device's public key $pk_{dvc}$=<e, N>, and the corresponding private key $sk_{dvc}$=<d, N, φ(N)>. The initialization algorithm proceeds as follows:

$$t \leftarrow_R \{0, 1\}^\kappa$$

$$u \leftarrow h_{dsb1}(t)$$

$$v \leftarrow_R \{0, 1\}^\kappa$$

$$a \leftarrow_R \{0, 1\}^\kappa$$

$$b \leftarrow f(v, \pi_0)$$

$$d_0 \leftarrow h(\pi_0)$$

$$d_1 \leftarrow_R \{0, 1\}^{\lambda+\kappa}$$

$$d_2 \leftarrow d - d_1 - d_0 \mod \phi(N)$$

$$\zeta \leftarrow E_{pk_{svr0}}(<u, d_2>)$$

$$\tau \leftarrow E_{pk_{svr0}}(<a, b, 0, \zeta, N>)$$

Above, h is assumed to output a (λ+κ)-bit value. The values $pk_{dvc}$, u and record <$svr_0$, $pk_{svr_0}$, τ, t, v, $d_1$, a> are saved on stable storage in the device. All other values, including d, φ(N), $\pi_0$, b, $d_0$, $d_2$ and ξ, are deleted from the device. The value t should be backed up offline for use in disabling if the need arises. The τ value is the device's "ticket" that it uses to access $svr_0$. The u value is the "ticket identifier."

The ticket τ will be sent to svr within the context of the S-RSA-DEL signing and delegation protocols (see subsections 1.3 and 1.4 below), and the server will inspect the contents of the ticket to extract its share $d_2$ of the device's private signing key.

In anticipation of its own compromise, dvc may include a policy statement within τ to instruct $svr_0$ as to what it should or should not do with requests bearing this ticket. This policy could include an intended expiration time for τ, instructions to cooperate in signing messages only of a certain form, or instructions to cooperate in delegating only to certain servers. As discussed above, here we assume a default policy that restricts delegation to only servers in U. For simplicity, we do not expressly illustrate this policy and its inspection in device initialization and subsequent protocols, however, given the inventive teachings herein, one of ordinary skill in the art will easily realize its implementation.

1.3 S-RSA-DEL Signature Protocol

This subsection illustratively explains the protocol by which the device signs a message m. The input provided to the device for this protocol is the input password $\pi$, the message m, and the identity svr of the server to be used, such that dvc holds an authorization record <svr, $pk_{svr}$, $\tau$, t, v, $d_1$, a>, generated either in the initialization procedure of subsection 1.2 above, or in the delegation protocol of subsection 1.4 below. Recall that dvc also stores $pk_{dvc}$=<e, N>.

In general, this protocol generates a signature for m by constructing encode $(m, r)^{d_0+d_1+d_2}$ mod N, where $d_0$ is derived from the user's password, $d_1$ is stored on dvc, and $d_2$ is stored (partially encrypted) in $\tau$. Further, v=encode$(m, r)^{d_2}$ mod N is computed at svr after svr has confirmed that the $\beta$ value contained within the ciphertext $\gamma$ is valid evidence that dvc holds the user's password. The device multiples v by encode $(m, r)^{d_0+d_1}$ mod N to get the desired result. It is important that the device delete $\beta$, $d_0$ and $\rho$ (used to encrypt v) when the protocol completes, and that it never store them on stable storage.

Further, $\delta$ is a message authentication code computed using a, to show the server that this request originated from the device. $\delta$ enables svr to distinguish an incorrect password guess by someone holding the device from a request created by someone not holding the device. Since svr should respond to only a limited number of the former (lest it allow an online dictionary attack to progress too far), $\delta$ is important in preventing denial-of-service attacks against the device by an attacker who has not compromised the device.

FIG. 1 illustrates an illustrative embodiment of such an S-RSA-DEL signature protocol 100. In step 102, the device computes $\beta$, which as mentioned above is a value that proves the device's knowledge of $\pi$ to the server. The device computes $\rho$ in step 104, which is a one-time pad by which the server encrypts v to return it to the device. The value r is a $\kappa_{sig}$-bit value used in the 'encode' function and is computed in step 106. The value $\gamma$ is computed in step 108 and represents an encryption of m, r, $\beta$ and $\rho$ in order to securely transport them to the server.

In step 110, $\delta$ is computed by the device and represents, as mentioned above, a message authentication code computed using a to show the server that this request originated from the device.

Next, in step 112, the device transmits the values $\gamma$, $\delta$ and $\tau$ to the server.

Upon receipt of these values, the server decrypts the ticket $\tau$ in order to recover values a, b and u, $d_2$ and N in step 114. In step 116, the server uses $\gamma$, $\delta$ and $\tau$ to confirm that this request for a private key actually originated from the device. Thus, if $mac_a$ (<$\gamma$, $\tau$>)$\neq\delta$, then the server aborts the private key retrieval operation. Also, in step 118, the server aborts the operation if it is determined that u (ticket identifier) is disabled. In step 120, the server decrypts $\gamma$ in order to recover values m, r, $\beta$ and $\rho$. In step 122, the server determines whether it is in receipt of a request that bears $\tau$ and originated from the device but that is a request for which the device's knowledge of the user's password cannot be verified. Thus, if $\beta\neq b$, then the server aborts the private key operation.

Assuming the operation is not terminated in step 116, 118 or 122, the server computes v in step 124 using the 'encode' function m, r, $d_2$ (the server's share of d) and N. In step 126, the server then computes parameter $\eta$ by performing an exclusive-OR operation between $\rho$ and v. In step 128, the server transmits the result $\eta$ to the device.

In step 130, the device computes parameter v by performing an exclusive-OR operation between $\rho$ and $\eta$. The device computes $d_0$ in step 132 as $f(v, \pi)$. In step 134, the device computes the signature s using the 'encode' function m, r, $d_0$, $d_1$ and N. The signature is verified in step 136, and returned (outputted) in step 138.

The efficiency of the S-RSA-DEL signature protocol illustrated in FIG. 1 may generally be worse than the signing efficiency of the underlying RSA signature scheme, not only because of the message and encryption costs, but also because certain optimizations (e.g., Chinese remaindering) that are typically applied for RSA signatures cannot be applied in S-RSA-DEL. Nevertheless, since dvc can compute (encode $(m, r))^{d_0+d_1}$ mod N while awaiting a response from svr, a significant portion of the device's computation can be parallelized with the server's computation.

1.4 S-RSA-DEL Delegation Protocol

This subsection illustratively explains the protocol by which the device delegates the capability to help it perform cryptographic operations to a new server. The inputs provided to the device are the identity svr of the server to be used, such that dvc holds an authorization record <svr, $pk_{svr}$, $\tau$, t, v, $d_1$, a>, a public key $pk_{svr'}$ for another server svr' $\in$U, and the input password $\pi$. As described above in subsection 1.2, one could also input additional policy information here. Recall that dvc also stores $pk_{dvc}$=<e, N>. The protocol is described in FIG. 2. In this figure, it is assumed that $h_{dele}$ outputs a $(\lambda+\kappa)$-bit value.

The overall goal of the protocol in FIG. 2 is to generate a new share $d'_2$ for server svr', and new share $d'_1$ and new ticket $\tau'$ for the device to use with svr'. The device's new share $d'_1$ is created as the sum of $d'_{11}$ and $d'_{12}$, selected randomly by dvc and svr, respectively. The new share $d'_2$ for svr' is constructed as $d'_2=d'_{12}+d'_{22}=(d_1-d'_{11})+(d_2-d'_{21})$, with the first and second terms being computed by dvc and svr, respectively. As a result, $d'_1+d'_2=d_1+d_2$. Note that the two terms $d'_{12}$ and $d'_{22}$ are actually stored separately in the ticket, with $d'_{22}$ being encrypted by the consenting server so the device can not determine the full share $d'_2$ when it constructs the new ticket.

In addition to the manipulation of these shares of d, this protocol borrows many components from the signature protocol of FIG. 1. For example, $\beta$, $\gamma$ and $\delta$ all play similar roles in the protocol as they did in FIG. 1. And deletion is once again important: dvc must delete $\alpha$, $\beta$, b', $d'_{11}$, $d'_{21}$, $\rho$, $\xi'$, and all other intermediate computations at the completion of this protocol. Similarly, svr should delete $\alpha$, $\beta$, b, $d_{12}$, $d_{22}$, $d'_{21}$, $d'_{22}$, $\rho$, $\xi'$, and all other intermediate results when it completes.

The value $\alpha$ is important in this protocol for protecting against denial-of-service attacks by a network attacker. $\alpha$ is a mac key used to authenticate svr's response to dvc. This is important to prevent a network attacker from falsifying the value $\eta$ to the dvc in the delegation protocol. Since dvc cannot verify the correctness of $\eta$, permitting the falsification of $\eta$ could result in dvc completing this protocol with a corrupt and useless authorization record <svr', $pk_{svr'}$, $\tau'$, t, v', d'$_1$, α'>. Thus, dvc authenticates the response from svr using a to prevent a network attacker from falsifying η. It is important to note, however, that a corrupt svr could still undetectably generate η incorrectly, and so α provides limited (but practically important) protection in this regard. It is also interesting to contrast the use of α in this protocol with the absence of any such mechanism in the S-RSA-DEL signature protocol in FIG. 1. In the signature protocol of FIG. 1, dvc can detect an incorrect response, and so there we omit any further authentication of svr's response.

FIG. 2 illustrates an illustrative embodiment of the S-RSA-DEL delegation protocol 200. In step 202, the device computes α. In step 204, the device computes β, which as mentioned above is a value that proves the device's knowledge of π to the server. The device, as shown in FIG. 2, then computes ρ in step 206. The value γ is computed in step 208 and represents an encryption of β, pk$_{svr'}$, ρ and α in order to securely transport them to the server. In step 210, δ is computed by the device and represents, as mentioned above, a message authentication code computed to show the server that this request originated from the device.

Next, in step 212, the device transmits the values γ, δ and τ to the server.

Upon receipt of these values, the server decrypts the ticket τ, in step 214, to obtain a, b, d$_{12}$, ξ, and N. In step 216, the server determines whether this request actually originated from the device, and aborts the operation if it is determined that it has not. In step 218, the server decrypts γ to obtain β, pk$_{svr'}$, ρ and α. In step 220, the server determines whether it is in receipt of a request that bears τ and originated from the device but that is a request for which the device's knowledge of the user's password cannot be verified. Thus, if β≠b, then the server aborts the operation. In step 222, the server decrypts ξ to obtain u and d$_{22}$. In step 224, the server aborts the operation if it is determined that u (ticket identifier) is disabled.

In step 226, the server computes d$_2$ from d$_{12}$ and d$_{22}$. In steps 228 and 230, the server computes d'$_{21}$ and d'$_{22}$, respectively. Next, the server encrypts u and d'$_{22}$, in step 232, to generate ξ'. In step 234, the server then computes parameter η by exclusively-ORing ρ with d'$_{21}$ and ξ'. Then, in step 236, the server computes δ' based on η. In step 238, the server transmits the results δ' and η to the device.

In step 240, the device determines whether the received results actually originated from the server, and aborts the operation if it is determined that it has not. Further, as shown in FIG. 2, the device goes on to compute the values of d'$_{21}$ and ξ' from η in step 242. Next, in steps 244 and 246, the device computes d'$_{11}$ and d'$_{12}$ respectively, and then uses these values, in step 248, to compute d'$_1$. The device then goes on to compute v', a' and b' in steps 250, 252 and 254, respectively.

Then, in step 256, the device computes τ' as an encryption of a', b', d'$_{12}$, ξ' and N. Lastly, in step 258, the device stores svr', pk$_{svr'}$, τ', t, v', d'$_1$ and a'. These values are to be used when the device performs a signature protocol with a secondary server svr'.

To relate this protocol to the system model discussed above, we define the execution of the code before the first message in FIG. 2 to constitute a dvc.startDelegation(svr, svr') event. Likewise, we define the execution of the code after the second message in FIG. 2 to constitute a dvc.finishDelegation(svr, svr') event. The event dvc.revoke(svr), though not pictured in FIG. 2, can simply be defined as dvc deleting any authorization record <svr, pk$_{svr'}$, τ, t, v, d$_1$, a> and halting any ongoing delegation protocols to authorize svr.

1.5 Key Disabling

The S-RSA-DEL signature system of the invention supports the ability to disable the device's key at servers, as would be appropriate to do if the device were stolen. Provided that the user backed up t before the device was stolen, the user can send t to a server svr. The server svr can then store u=h$_{dsbl}$(t) on a list of disabled ticket identifiers. Subsequently, svr should refuse to respond to any request containing a ticket τ with a ticket identifier u. Rather than storing u forever, the server can discard u once there is no danger that pk$_{dvc}$ will be used subsequently (e.g., once the public key has been revoked). Note that for security against denial-of-service attacks (an attacker attempting to disable u without t), we do not need h$_{dsbl}$ to be a random oracle, but simply a one-way hash function.

In relation to the model described above, svr.disable denotes the event in which svr receives t and marks u =h$_{dsbl}$(t) as disabled. For convenience, we say that a ticket τ is disabled at svr if τ contains u as its ticket identifier and u is marked as disabled at svr.

2. Delegation for D-ELG

In addition to RSA signatures, ElGamal decryption has also been used to demonstrate the general approach to achieving capture-resilient devices presented herein. As mentioned, Ser. No. 10/072,331 presented a protocol D-ELG by which the device can perform an ElGamal decryption only after validating the user's password at a designated remote server. In this section, a protocol is illustrated for achieving the above-mentioned goals, including delegation, for ElGamal decryption. This inventive protocol is referred to as D-ELG-DEL.

2.1 Preliminary Considerations

For ElGamal encryption, the public and private keys of the device are pk$_{dvc}$=<g, p, q, y> and Sk$_{dvc}$=<g, p, q, x>, respectively, where p is a λ-bit prime, g is an element of order q in $Z_p^*$, x is an element of $Z_q$ chosen uniformly at random, and y=g$^x$ mod p. Following Ser. No. 10/072,331, we describe the D-ELG protocol using an abstract specification of "ElGamal-like" encryption. An ElGamal-like encryption scheme is an encryption scheme in which: (i) the public and private keys are as above; and (ii) the decryption function D can be expressed in the following form:

$$D_{<g, p, q, x>}(c): \text{abort if valid}(c)=0$$

$$w \leftarrow \text{select}(c)$$

$$z \leftarrow w^x \bmod p$$

$$m \leftarrow \text{reveal}(z, c)$$

$$\text{return } m$$

Above, valid(c) tests the well-formedness of the ciphertext c; returning a one if well-formed and a zero otherwise. Further, select(c) returns the argument w that is raised to the x-th power modulo p. Still further, reveal(z, c) generates the plaintext m using the result z of that computation. For example, in original ElGamal encryption, where q=p−1 and c=<c$_1$, c$_2$>=<g$^k$ mod p, my$^k$ mod p> for some secret value k∈$Z_q$, valid(c$_1$, c$_2$) returns one if c$_1$, c$_2$∈$Z_p^*$ and zero otherwise; select(<c$_1$, c$_2$>) returns c$_1$; and reveal(z, <c$_1$, c$_2$>) returns c$_2$z$^{-1}$ mod p. We note, however, that the private key is not an argument to valid, select, or reveal; rather, the private key is used only in computing z. Using this framework, the D-ELG-DEL protocol of the invention is described in the following subsections.

There are several possibilities for ElGamal-like encryption schemes that, when used to instantiate the framework above, enable goals G1-G4 to be proved for our D-ELG-DEL protocol. Nonetheless, the precise senses in which a particular instance can satisfy goal G4 deserve some discussion. The most natural definition of security for key disabling is that an adversary in class A4 who is presented with a ciphertext c after time $max_{svr \in U}$ T{svr.disable} will be unable to decrypt c. A stronger definition for key disabling could require that c remain indecipherable even if c were given to the adversary before this time, as long as c were not sent to any svr in U before disabling.

If the original ElGamal scheme is secure against indifferent chosen ciphertext attacks, then the D-ELG-DEL protocol can be proven secure in the former sense when instantiated with original ElGamal. However, the security of ElGamal in this sense has not been established, and is an active area of research. There are, however, ElGamal-like encryption schemes that suffice to achieve even the latter, stronger security property, such as proposed in V. Shoup et al., "Securing Threshold Cryptosystems Against Chosen Ciphertext Attack," EUROCRYPT '98, pp. 1-16, 1998, the disclosure of which is incorporated by reference herein. When the inventive protocol is instantiated with one of these schemes, D-ELG-DEL can be proved secure even in the stronger sense, in the random oracle model.

2.2 Device Initialization

The inputs to device initialization are the identity of a server $svr_0$ along with its public encryption key $pk_{svr_0}$, the user's password $\pi_0$, the device's public key $pk_{dvc}$=<g, p, q, y>, and the corresponding private key $sk_{dvc}$=<g, p, q, x>. The initialization algorithm proceeds as follows:

$t \leftarrow_R \{0, 1\}^\kappa$ $u \leftarrow h_{dsbl}(t)$ $v \leftarrow_R \{0, 1\}^\kappa$ $a \leftarrow_R \{0, 1\}^\kappa$ $b \leftarrow f(v, \pi_0)$ $x_0 \leftarrow h(\pi_0)$ $x_1 \leftarrow_R Z_q$ $x_2 \leftarrow x - x_1 - x_0 \mod q$ $\xi \leftarrow E_{pk_{svr_0}}(<u, x_2>)$ $\tau \leftarrow E_{pk_{svr_0}}(<a, b, g, p, q, 0, \xi>)$ We assume h produces an output of $\lambda+\kappa$ bits. The value $pk_{dvc}$ and the authorization record <$svr_0$, $pk_{svr_0}$, $\tau$, t, v, $x_1$, a>, are saved on stable storage in the device. All other values, including b, u, x, $x_0$, $x_2$, $\xi$, and $\pi_0$, are deleted from the device. The value t should be backed up offline for use in disabling if the need arises. The value $\tau$ is the device's "ticket" that it uses to access the service.

2.3 D-ELG-DEL Decryption Protocol

This subsection describes the protocol by which the device decrypts a ciphertext c generated using the device's public key in an ElGamal-like encryption scheme. The input provided to the device for this protocol is the input password $\pi$, the ciphertext c, and the identity svr of the server to be used, such that dvc holds a record <svr,$pk_{svr}$, $\tau$, t, v, $x_1$, a>. Recall that dvc also stores $pk_{dvc}$=<g, p, q, y>.

Further, $h_{zkp}$ is assumed to return an element of $Z_q$. It should be observed that, with DELG-DEL, the device's decryption function is implemented jointly by dvc and svr. Moreover, <v, e, s>constitutes a noninteractive zero-knowledge proof from svr (the "prover") to dvc (the "verifier") that svr constructed its contribution v correctly. As before, $\beta$ is a value that proves the device's knowledge of $\pi$ to the server, $\gamma$ is an encryption of c, $\beta$, and $\rho$ to securely transport them to the server, and $\delta 0$ is a message authentication code computed using a, to show the server that this request originated from the device.

Figure 3:
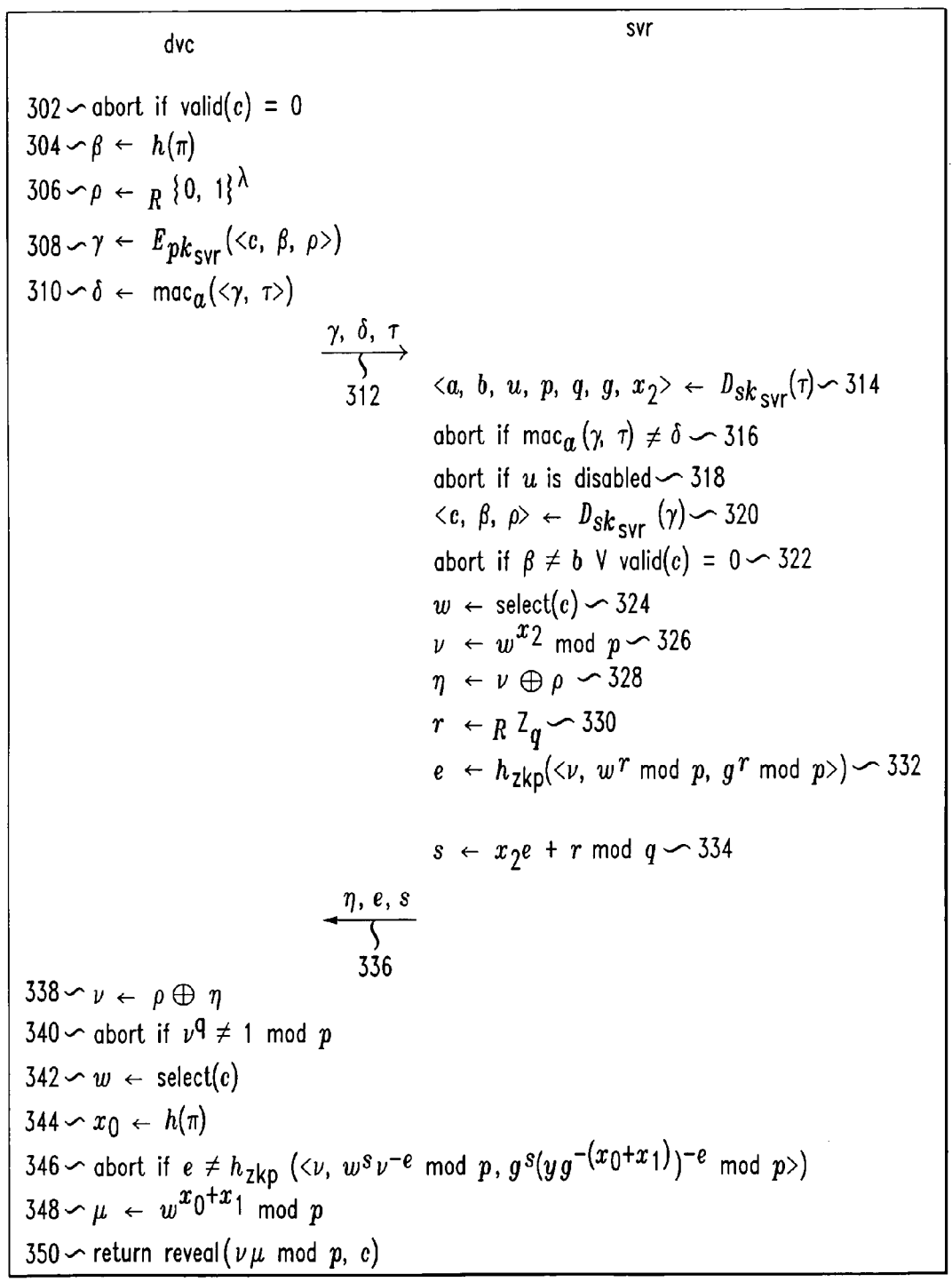
FIG. 3 is a flow diagram illustrating a decryption protocol in accordance with an embodiment of the present invention.

FIG. 3 illustrates an illustrative embodiment of such an D-ELG-DEL signature protocol 300. In step 302, the well-formedness of the ciphertext c is tested by the device. If the function valid(c) returns a zero, the decryption protocol is aborted. If the function valid(c) returns a one, the decryption protocol continues on to the next steps. As before, the device computes $\beta$ in step 304, which is a value that proves the device's knowledge of $\pi$ to the server. The device computes $\rho$ in step 306. As before, $\rho$ is a one-time pad by which the server encrypts certain values (in this case, v, e, s) to return them to the device after performing its share of the decryption operations. In step 308, the device computes $\gamma$, which is an encryption of c, $\beta$, and $\rho$, to securely transport these values to the server. In step 310, the device also computes value $\delta$, which is a message authentication code computed using a, to show the server that this request originated from the device.

Next, in step 312, the device transmits the values $\gamma$, $\delta$ and $\tau$ to the server.

Upon receipt of these values, the server decrypts the ticket $\tau$ in order to recover values a, b, u, p, q, g and $X_2$ in step 314. As before, in step 316, the server uses $\gamma$, $\delta$ and $\tau$ to confirm that this request for a private key actually originated from the device. Thus, if $mac_a$ (<$\gamma$, $\tau$>)$\neq \delta$, then the server aborts the decryption operation. In step 318, the server aborts the operation if it is determined that u (ticket identifier) is disabled.

In step 320, the server decrypts $\gamma$ in order to recover values c, $\beta$ and $\rho$. In step 322, the server determines whether it is in receipt of a request that bears $\tau$ and originated from the device, but that it is a request for which the device's knowledge of the user's password cannot be verified. Thus, if $\beta \neq b$, then the server aborts the decryption operation.

In step 324, the expression select(c) returns the argument w that is then raised to the x-th power modulo p in step 326 to generate v. In step 328, the server then computes parameter $\eta$ by performing an exclusive-OR operation between $\rho$ and v. The value r is computed by the server in step 330. Then, in step 332, values v, v', $g^r$ mod p are hashed using function $h_{zkp}$ in order to generate e. The value s is then computed by the server in step 334. In step 336, the server transmits the results $\eta$, e, and s to the device.

In step 338, the device computes value v by performing an exclusive-OR operation between $\rho$ and $\eta$. A check is made in step 340 to determine whether $v^q$ is equal to 1 mod p. If not, the operation is aborted. The device, in step 342 (like step 322 at the server), computes w using select(c). In step 344, the device computes $x_0$ as a hash of $\pi$. In step 346, a check is made to confirm that the returned value of e is consistent with the hash function $h_{zkp}$. If it is not, then the decryption operation is aborted. The value $\mu$ is computed in step 348 as $w^{x_0+x_1}$ mod p. Then, in step 350, the reveal expression generates the plaintext m using v, $\mu$, p and c.

Thus, it is to be understood that the device's decryption function is implemented jointly by dvc and svr in accordance with the protocol, in a manner that supports delegation.

Decryption via the D-ELG-DEL protocol may be somewhat more costly than decryption in the underlying ElGamal-like encryption scheme. As in S-RSA-DEL, it is preferred that dvc compute μ while awaiting a response from svr in order to parallelize computation between the two.

2.4 D-ELG-DEL Delegation Protocol

In this subsection, a protocol is provided by which the device delegates the password-checking function from an authorized server svr to another server svr'. The inputs provided to the device for this protocol are the identity of svr, such that dvc holds a record <svr, $pk_{svr}$, τ, t, v, $x_1$, a>, the public key $pk_{svr'}$ for svr', and the input password π. As stated above, one could also input policy information here. Recall that dvc also stores $pk_{dvc}$=<g, p, q, y>. The protocol is described in FIG. 4.

In general, the overall goal of the D-ELG-DEL protocol is to generate a new share $x'_2$ for server svr', and new share $x'_1$ and new ticket τ' for the device to use with svr'. The values $x'_1$ and $x'_2$ are constructed in a fashion similar to how $d'_1$ and $d'_2$ were constructed in FIG. 2, i.e., using correlated random offsets from $x_1$ and $x_2$ computed jointly by dvc and svr. In D-ELG-DEL, β, γ, δ, δ' and α play roles similar to those in S-RSA-DEL. It is important that the device delete β, b', ρ and all other intermediate results when the protocol completes, and to never store them on stable storage.

FIG. 4 illustrates an illustrative embodiment of the D-ELG-DEL delegation protocol 400. In step 402, the device computes β, which as mentioned above is a value that proves the device's knowledge of π to the server. Then, as shown in FIG. 4, the device computes ρ in step 404. In step 406, the device computes α. The value γ is computed in step 408 and represents an encryption of β, $pk_{svr'}$, ρ and α in order to securely transport them to the server. In step 410, δ is computed by the device and represents, as mentioned above, a message authentication code computed to show the server that this request originated from the device.

Next, in step 412, the device transmits the values γ, δ and τ to the server.

Upon receipt of these values, the server decrypts the ticket τ, in step 414, to obtain a, b, g, p, q, $x_{12}$, and ξ. In step 416, the server determines whether this request actually originated from the device, and aborts the operation if it is determined that it has not. In step 418, the server decrypts γ to obtain β, $pk_{svr'}$, ρ and α. In step 420, the server determines whether it is in receipt of a request that bears τ and originated from the device but that is a request for which the device's knowledge of the user's password cannot be verified. Thus, if β≠b, then the server aborts the operation. In step 422, the server decrypts ξ to obtain u and $x_{22}$. In step 424, the server aborts the operation if it is determined that u (ticket identifier) is disabled.

In step 426, the server computes $x_2$ from $x_{12}$ and $x_{22}$. In steps 428 and 430, the server computes $x'_{21}$ and $x'_{22}$, respectively. Next, the server encrypts u and $x'_{22}$, in step 432, to generate ξ'. In step 434, the server then computes parameter η by exclusively-ORing ρ with $x'_{21}$ and ξ'. Then, in step 436, the server computes δ' based on η. In step 438, the server transmits the results δ' and η to the device.

In step 440, the device determines whether the received results actually originated from the server, and aborts the operation if it is determined that it has not. Further, as shown in FIG. 4, the device goes on to compute the values of $x'_{21}$ and ξ' from η in step 442. Next, in steps 444 and 446, the device computes $x'_{11}$ and $x'_{12}$, respectively, and then uses these values, in step 448, to compute $x'_1$. The device then goes on to compute v', a' and b' in steps 450, 452 and 454, respectively.

Then, in step 456, the device computes τ' as an encryption of a', b', g, p, q, $x'_{12}$, and ξ'. Lastly, in step 458, the device stores svr', $pk_{svr'}$, τ', t, v', $x'_1$ and a'. These values are to be used when the device performs a decryption protocol with a secondary server svr'.

2.5 Key Disabling

Like S-RSA-DEL, the D-ELG-DEL protocol also supports key disabling. Assuming the user backed up t before the device was stolen, the user can send t to a server svr. svr can then store u=$h_{dsbl}$(t) on a list of disabled ticket identifiers. Subsequently, svr should refuse to respond to any request containing a ticket τ with a ticket identifier u. Rather than storing u forever, the server can discard u once there is no danger that $pk_{dvc}$ will be used subsequently (e.g., once the public key has been revoked). Note that for security against denial-of-service attacks (an attacker attempting to disable u without t), we do not need $h_{dsbl}$ to be a random oracle, but simply a one-way hash function.

Figure 5:
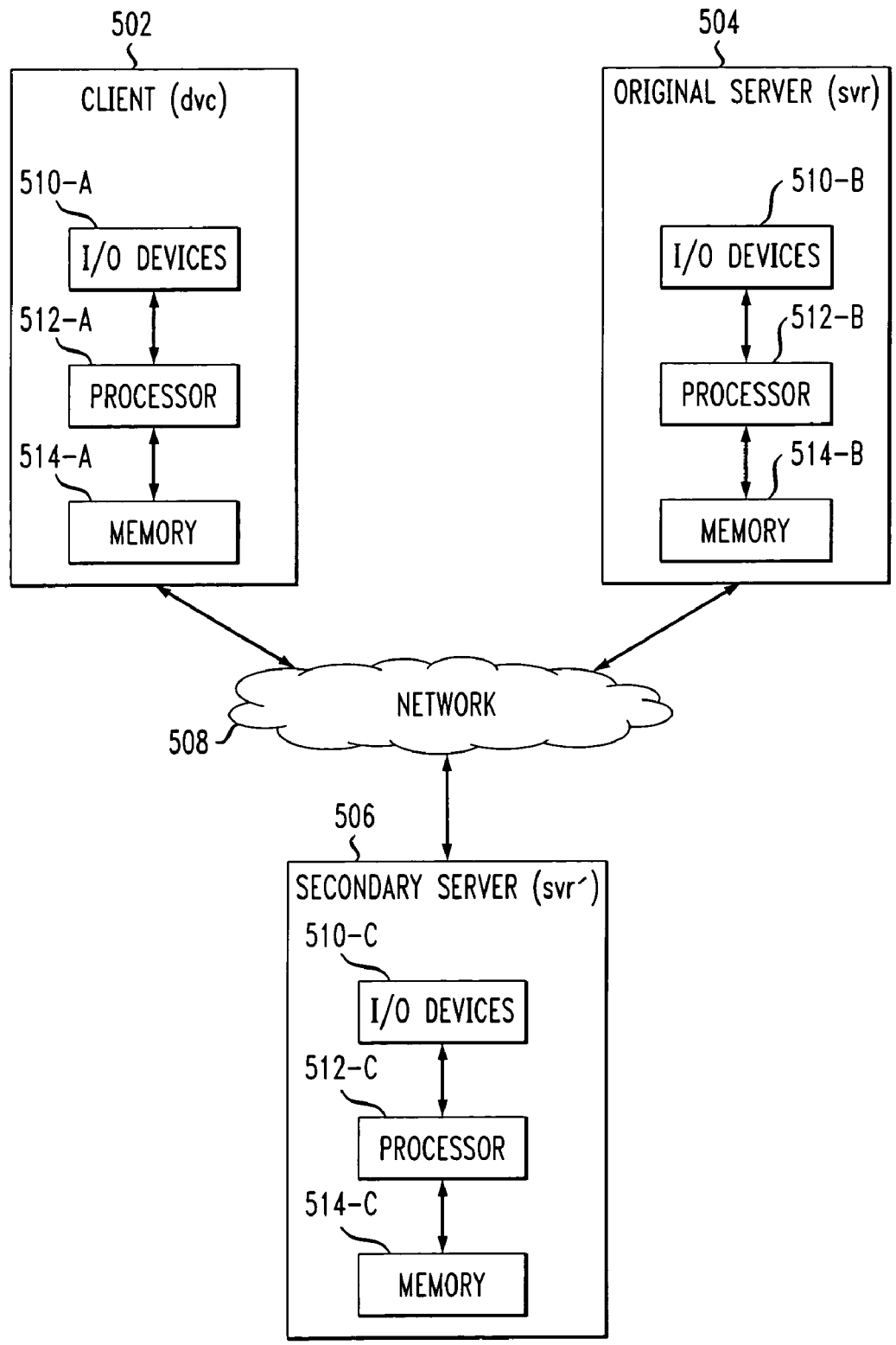
FIG. 5 is a block diagram illustrating a generalized hardware architecture of a data network and computer systems suitable for implementing one or more of the methodologies according to the present invention.

Referring now to FIG. 5, a block diagram illustrates a generalized hardware architecture of a data network and computer systems suitable for implementing delegation-enablement, signature and decryption protocols according to the present invention. As shown, the client (e.g., dvc or device as used above in the protocol explanations) comprises a computer system 502, while an original server (e.g., svr as used above in the protocol explanations) comprises a computer system 504, and a secondary server (e.g., svr' as used above in the protocol explanations) comprises a computer system 506. The three computer systems 502, 504 and 506 are coupled via a data network 508. The data network may be any data network across which dvc, svr and svr' desire to communicate, e.g., the Internet. However, the invention is not limited to a particular type of network. Also, it is to be understood that the first and second server need not be part of the same network.

Typically, and as labeled in FIG. 5, dvc is a client machine, and svr and svr' are server machines. However, this is not required, and dvc, svr and svr' are referred to as client and servers, only as an example to show a typical case. Thus, it is to be understood that the protocols of the present invention are not limited to the case where dvc, svr and svr' are client and servers, but instead is applicable to any computing devices comprising dvc, svr and svr'. As mentioned above, while one scenario envisions a client device (dvc) delegating a password-checking function from one server (svr) to another server (svr'), the client may delegate such task to a hardware token in her possession.

As is readily apparent to one of ordinary skill in the art, the servers and client may be implemented as programmed computers operating under control of computer program code. The computer program code is stored in a computer readable medium (e.g., a memory) and the code is executed by a processor of the computer system. Given this disclosure of the invention, one skilled in the art can readily produce appropriate computer program code in order to implement the protocols described herein.

In any case, FIG. 5 generally illustrates an exemplary architecture for each computer system communicating over the network. As shown, the client device comprises I/O devices 510-A, processor 512-A, and memory 514-A. The original server system comprises I/O devices 510-B, processor 512-B, and memory 514-B. The secondary server system comprises I/O devices 510-C, processor 512-C, and memory 514-C. It should be understood that the term "processor" as used herein is intended to include one or more processing devices, including a central processing unit (CPU) or other processing circuitry. Also, the term "memory" as used herein is intended to include memory associated with a processor or CPU, such as RAM, ROM, a fixed memory device (e.g., hard drive), or a removable memory device (e.g., diskette or CDROM). A portion of this memory may serve as "stable storage," as referred to above. In addition, the term "I/O devices" as used herein is intended to include one or more input devices (e.g., keyboard, mouse) for inputting data to the processing unit, as well as one or more output devices (e.g., CRT display) for providing results associated with the processing unit. Accordingly, software instructions or code for performing the protocols/methodologies of the invention, described herein, may be stored in one or more of the associated memory devices, e.g., ROM, fixed or removable memory, and, when ready to be utilized, loaded into RAM and executed by the CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method for use in a device associated with a first party, performed in association with a device associated with a second party, for delegating authorization to perform a function from the second party device to a device associated with a third party, the method comprising the steps of:
    generating in the first party device a request for a partial assistance of the second party device in delegating authorization of the function to the third party device, wherein the request generated in the first party device comprises cryptographic information;
    transmitting the request from the first party device to the second party device;
    receiving results in the first party device generated by the second party device based on the partial assistance provided by the second party device; and
    using at least a portion of the received results in the first party device to delegate authorization, such that the first party device communicates directly with the third party to perform the function;
    wherein at least a portion of data stored on the first party device was constructed by generating a first share, a second share and a third share of a value associated with the first party device, wherein the first share is constructed so that the share can be generated from a piece of secret information associated with the first party and information stored on the first party device, wherein the data stored on the first party device comprises an encryption of at least a portion of the third share of the value in accordance with a public key associated with the second party device so as to generate cryptographic information;
    wherein the share in the request is split at the second party device such that a portion of a third party share is generated at the second party device.

2. The method of claim 1, wherein the second party is the same as the third party.

3. The method of claim 1, wherein the first party device is a client device and the second and third party devices are servers.

4. The method of claim 1, wherein data stored on the first party device has a piece of secret information associated therewith which is included in the request, and further wherein the partial assistance is provided by the second party device when a verification is made by the second party device, based on the piece of secret information, that the first party sent the request.

5. The method of claim 1, wherein the function being delegated is a password-checking operation.

6. The method of claim 1, wherein the step of using at least a portion of the received results in the first party device to delegate authorization comprises generating at least one value, using at least the portion of the third party share generated by the second party device, for subsequent use between the first party device and the third party device in performing the function.

7. The method of claim 1, wherein the value associated with the first party device is a private key.

8. The method of claim 7, wherein the private key is used to perform a private key operation between the first party device and the third party device.

9. The method of claim 8, wherein the private key operation comprises a decryption operation.

10. The method of claim 9, wherein the decryption operation comprises an ElGamal protocol.

11. The method of claim 8, wherein the private key operation comprises a signature operation.

12. The method of claim 11, wherein the signature operation comprises an RSA protocol.

13. The method of claim 1, wherein the third party device is a token in the possession of the first party.

14. A method for use in a device associated with a first party, performed in association with a device associated with a second party, for assisting in delegating authorization to perform a function from the first party device to a device associated with a third party, the method comprising the steps of:
    receiving a request generating in and transmitted by the second party device for a partial assistance of the first party device in delegating authorization of the function to the third party device, wherein the request generated in the second party device comprises cryptographic information; and
    generating results in the first party device based on the partial assistance provided thereby for use in the second party device to delegate authorization, such that the second party device communicates with the third party device to perform the function;
    wherein at least a portion of data stored on the second party device was constructed by generating a first share, a second share and a third share of a value associated with the second party device, wherein the first share is constructed so that the share can be generated from a piece of secret information associated with the second party and information stored on the second party device, wherein the data stored on the second party device comprises an encryption of at least a portion of the third share of the value in accordance with a public key associated with the first party device so as to generate cryptographic information;
    wherein the share in the request is split at the first party device such that a portion of a third party share is generated at the first party device.

15. The method of claim 14, wherein the first party is the same as the third party.

16. The method of claim 14, wherein the first and third party devices are servers and the second party device is a client device.

17. The method of claim 14, wherein the use of at least a portion of the generated results in the second party device to delegate authorization comprises generating at least one value, using at least the portion of the third party share generated by the first party device, for subsequent use between the second party device and the third party device in performing the function.

* * * * *